(12) United States Patent
Son et al.

(10) Patent No.: US 7,615,951 B2
(45) Date of Patent: Nov. 10, 2009

(54) METHOD AND SYSTEM FOR LIMITING THE OPERATING TEMPERATURE OF AN ELECTRIC MOTOR

(75) Inventors: Yo Chan Son, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 38 days.

(21) Appl. No.: 11/850,983

(22) Filed: Sep. 6, 2007

(65) Prior Publication Data

US 2009/0066283 A1 Mar. 12, 2009

Related U.S. Application Data

(60) Provisional application No. 60/843,134, filed on Sep. 8, 2006.

(51) Int. Cl.
*H02P 7/00* (2006.01)

(52) U.S. Cl. .................. 318/432; 318/641; 318/471

(58) Field of Classification Search ............... 361/25; 318/432, 641, 471, 431, 434, 708, 681; 388/934
See application file for complete search history.

(56) References Cited

U.S. PATENT DOCUMENTS 5,548,539 A * 8/1996 Vlach et al. .................. 703/6
6,992,452 B1 * 1/2006 Sachs et al. ................ 318/434

* cited by examiner

*Primary Examiner*—Karen Masih
(74) *Attorney, Agent, or Firm*—Ingrassia, Fisher & Lorenz, P.C.

(57) ABSTRACT

A method and system for limiting the operating temperature of an electric motor is provided. A maximum operational temperature of the motor is determined. A current operational temperature within the motor is sensed. A maximum allowable power dissipation of the motor is calculated based at least in part on the maximum operational temperature and the current operational temperature of the motor. A torque command for the motor is generated based on the maximum allowable power dissipation.

16 Claims, 6 Drawing Sheets

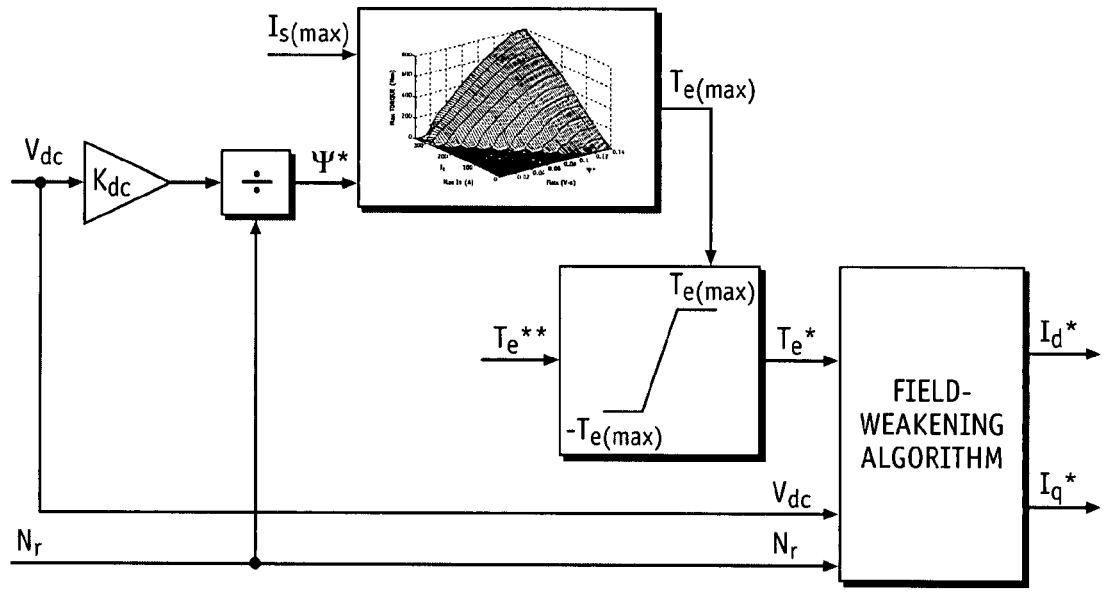

FIG. 7

| PERIOD | OPERATING SPEED, $N_r$ (r/min) | TORQUE SPEED, $T_e^{**}$(Nm) | dc-bus VOLTAGE, $V_{dc}$ (V) | COMMENT |
|---|---|---|---|---|
| P1: $t_0 \sim t_1$ | 500 | 500 | | $T_e^{**} = T_e^*$ |
| P2: $t_1 \sim t_2$ | 500 | 500 | | $T_e^*$ is limited by $T_{e(max)}$ |
| P3: $t_2 \sim t_3$ | 1200 | 500 | 300 | Uncontrolled mode due to excessive field-weakening current |
| P4: $t_3 \sim t_4$ | 800 | 500 | | Steady-state torque is lower than that of 500r/min due to core loss |
| P5: $t_4 \sim t_5$ | 500 | 500 | | Back to the same condition as P1 |
| P6: $t_5 \sim$ | 500 | 50 | | $T_e^{**}$ reduced below $T_{e(max)}$ |

FIG. 9

METHOD AND SYSTEM FOR LIMITING THE OPERATING TEMPERATURE OF AN ELECTRIC MOTOR

CROSS-REFERENCE TO RELATED APPLICATIONS

This application claims the benefit of U.S. Provisional Application No. 60/843,134, filed Sep. 8, 2006.

TECHNICAL FIELD

The present invention generally relates to electric motors, and more particularly relates to a method and system for limiting the operating temperature of an electric motor.

BACKGROUND OF THE INVENTION

In recent years, advances in technology, as well as ever evolving tastes in style, have led to substantial changes in the design of automobiles. One of the changes involves the complexity, as well as the power usage, of the various electrical systems within automobiles, particularly alternative fuel vehicles, such as hybrid, electric, and fuel cell vehicles.

The power and/or torque density required for motors used in such vehicles is extremely high. The amount of power or torque that can be generated by a particular motor is limited in large part by the winding, or coil, temperature within the motor during operation. If the motor is permitted to operate such that the winding temperature becomes too high, the efficiency of the motor may be adversely affected, the permanent magnet within the motor may become demagnetized, and the internal solder joints within the motor may be irreversibly damaged.

One method commonly used to protect motors from overheating is to simply shut down the motor when the internal temperature of the motor reaches a preset limit. Another method is to limit the torque proportionally to the temperature difference between the present winding temperature and the temperature limit. However, neither of these methods allows a torque limit to be set analytically at various stages of operation, nor do they guarantee continuous operation of the motor.

Accordingly, it is desirable to provide a system and method for limiting the operating temperature of an electric motor that allows the operational temperature to be continuously controlled at various stages of operation. In addition, it is desirable to provide a system and method that facilitates continuous operation of the motor while limiting the operating temperature. Furthermore, other desirable features and characteristics of the present invention will become apparent from the subsequent detailed description and the appended claims, taken in conjunction with the accompanying drawings and the foregoing technical field and background.

SUMMARY OF THE INVENTION

According to various exemplary embodiments, a method is provided for limiting an operational temperature of a motor. A maximum operational temperature of the motor is determined. A current operational temperature within the motor is sensed. A maximum allowable power dissipation of the motor is calculated based at least in part on the maximum operational temperature and the current operational temperature of the motor. A torque command for the motor is generated based on the maximum allowable power dissipation.

In other embodiments, an automotive drive system is provided. The system includes a motor, a power supply coupled to the motor, and a processor in operable communication with the motor and the power supply. The processor is configured to receive a maximum operational temperature of the motor, determine a current operational temperature within the motor, calculate a maximum allowable power dissipation of the motor based at least in part on the maximum operational temperature and the current operational temperature of the motor, and generate a torque command for the motor based at least in part on the maximum allowable power dissipation.

DESCRIPTION OF THE DRAWINGS

The present invention will hereinafter be described in conjunction with the following drawing figures, wherein like numerals denote like elements.

FIG. 7 is a schematic block diagram illustrating a method and/or system for generating a current command for a motor;

FIG. 9 is a table of various parameters of the experimental motor operation of FIG. 8.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-9 are merely illustrative and may not be drawn to scale.

FIG. 1 to FIG. 9 illustrate a method and/or system for limiting the operating temperature of an electric motor. An allowable power dissipation of the motor is generated based on the temperature difference between the maximum operational temperature and the current operational temperature. The allowable power dissipation is then converted to a torque limit that is used to limit the torque command of the motor.

According to another aspect of the present invention, an instantaneous coil temperature is estimated from a temperature sensor within the motor. A feed-forward term, based on a predetermined temperature limit for the motor, a sensed temperature of the motor, and the thermal resistance of the motor, defines the allowable maximum continuous power dissipation. A proportional integration (PI) regulator provides an instantaneous power dissipation limit of copper loss including the effect of core loss. The power dissipation limit is converted to the torque limit at a given flux condition, which can be incorporated with a conventional motor control algorithm.

Figure 1:
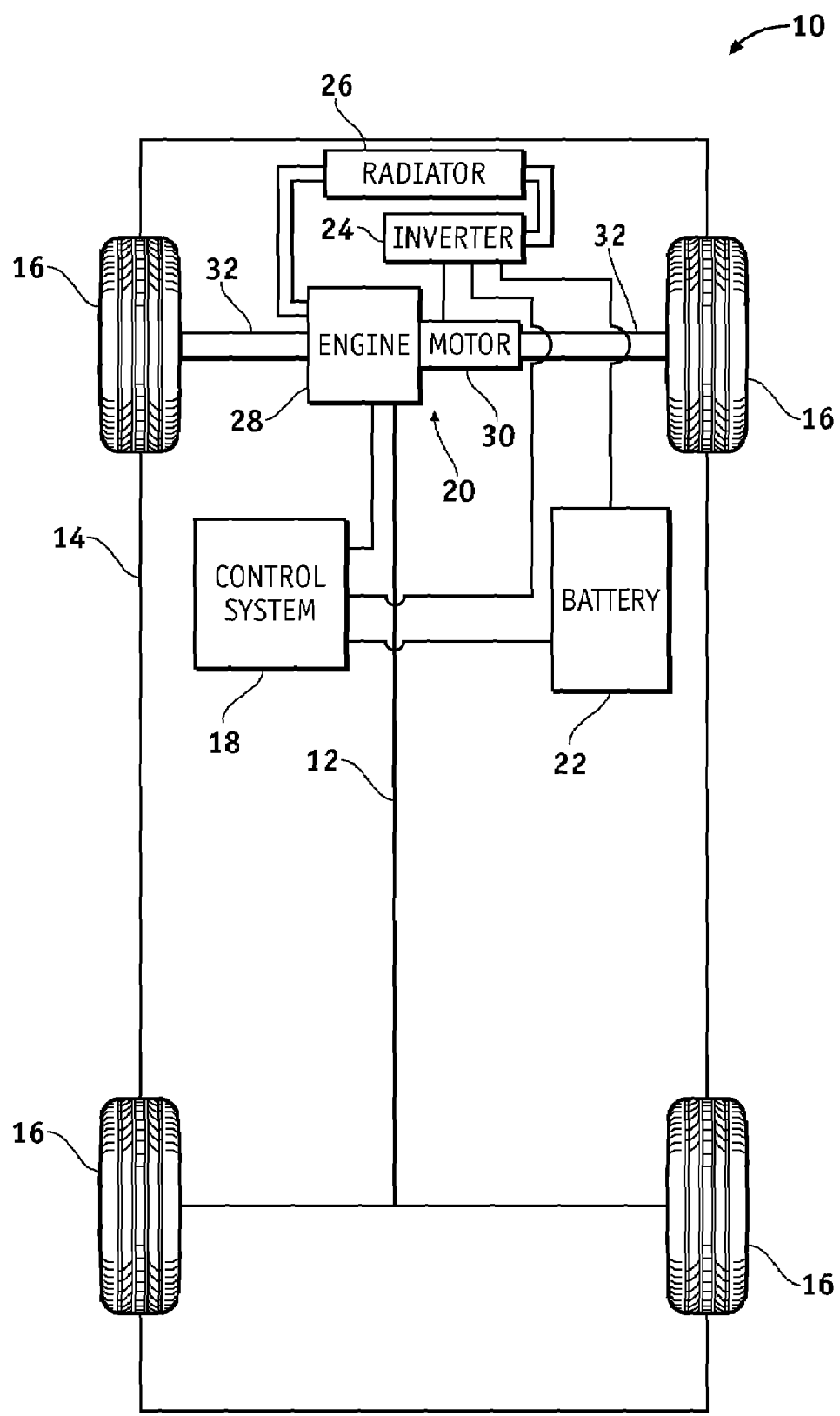
FIG. 1 is a schematic view of an exemplary automobile according to one embodiment of the present invention.

FIG. 1 illustrates a vehicle 10, or "automobile", according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the automobile 10 is a hybrid vehicle, and further includes an actuator assembly 20, a battery 22, an inverter assembly 24, and a radiator 26. The actuator assembly 20 includes a combustion engine 28 and an electric motor/generator (or motor) 30. As will be appreciated by one skilled in the art, the electric motor 30 includes a transmission therein, and although not illustrated also includes a stator assembly (including a plurality of conductive coils), a rotor assembly (including a ferromagnetic core), a cooling fluid (i.e., coolant), and at least one temperature sensor therein. The combustion engine 28 and the electric motor 30 are integrated such that both are mechanically coupled to at least some of the wheels 16 through one or more drive shafts 32. The radiator 26 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 28 and the inverter assembly (or inverter) 24. In one embodiment, the inverter 24 receives and shares coolant with the electric motor 30. The radiator 26 may be similarly connected to the inverter 24 and/or the electric motor 30.

The electronic control system 18 is in operable communication with the actuator assembly 20 (including the temperature sensors therein), the battery 22, and the inverter assembly 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

During operation, still referring to FIG. 1, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, direct current (DC) power is provided from the battery 22 to the inverter assembly 24 (i.e., the power inverter 34), which converts the DC power into alternating current (AC) power, before the power is sent to the electric motor 30.

Figure 2:
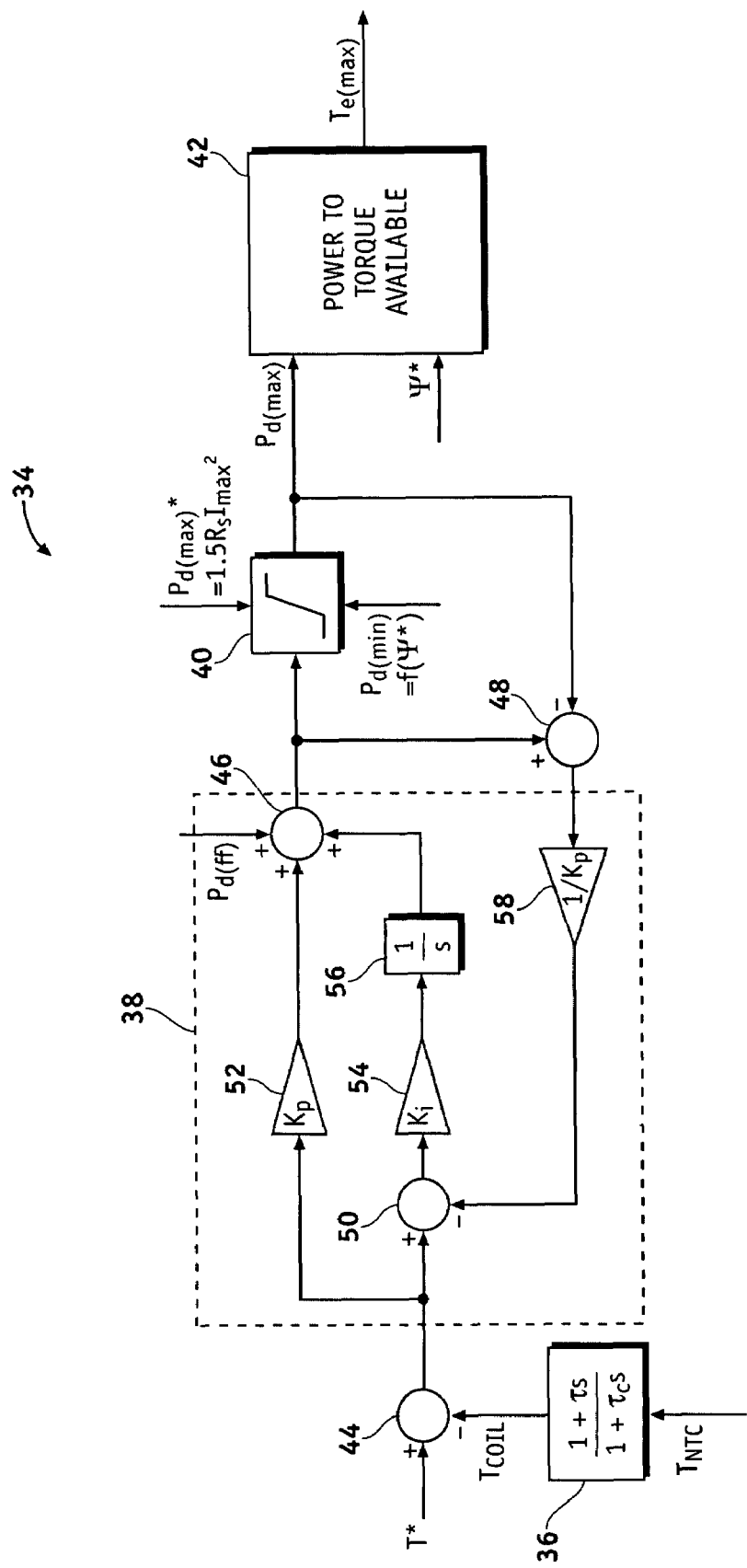
FIG. 2 is a schematic block diagram of a method and/or system for limiting an operating temperature of a motor.

FIG. 2 illustrates a method (and/or system) 34 for limiting the operational temperature of the motor 30, according to one embodiment of the present invention. The system 34 includes a lead compensator 36, a proportional integral, or integration, (PI) regulator 38, a power dissipation limiting block 40, and a power dissipation/torque conversion block 42. The system 34 also includes summers (or summation circuits) 44, 46, 48, and 50, with summers 46 and 50 being within the PI regulator 38. The PI regulator 38 further includes a proportional gain 52, an integrator gain 54, an integrator 56, and an inverse gain 58. The method and/or system 34 adjusts the copper loss proportional to the square of the motor current in order to limit the power dissipation inside the motor 30, which is the sum of the copper loss and the iron loss (or core loss).

Still referring to FIG. 2, the difference between the maximum operational temperature and the coil temperature is calculated by summer 44. If the sensed temperature changes more slowly than the actual coil temperature, the lead compensator 36 may be used to compensate for the delay of the sensed temperature. The PI regulator 38 generates the allowable power dissipation based on the difference between the maximum operational temperature and the coil temperature. The proportional gain 52 provides the allowable power dissipation proportionally to the difference. The integrator gain 54 and the integrator 56 provide the allowable power dissipation based on the time-integration of the temperature difference. The output of the integrator 56 is limited to zero or a negative value.

Summer 46 calculates the summation of the proportional term, the integrator term, and a feed-forward term. If this sum is not within the limits of limiting block 40, the difference between the output of summer 46 and the allowable power dissipation is calculated by summer 48. This difference is used to modify the input of the integrator gain 54 after being adjusted by the inverse gain 58, via summer 50, in order to prevent the overshoot or windup phenomenon of the PI regulator 38. The power dissipation/torque conversion block 42 converts the maximum allowable power dissipation into the maximum allowable torque at a given flux condition.

The operation of the method and/or system 34 will now be described in greater detail. As the motor 30 is operated, the temperature of the coils within the motor (i.e., the coil temperature ($T_{coil}$)) increases according to the power dissipated inside the motor. The coil temperature is not directly proportional to the power dissipation. However, the temperature difference between the coolant and the hot spot inside the motor is directly proportional to the power dissipation. According to one aspect of the present invention, the instantaneous and steady-state power generated by the motor is limited using this principle, and a way to identify the simple thermo-dynamic model of the motor is introduced. The derivation of the control method of the coil temperature is based on this thermo-dynamic model.

The coil temperature may be defined, in relation with the power dissipation, as $$T_{coil} = T_{coolant} + \Theta_{coil-coolant}(t) * P_d(I_s, N_r), \quad (1)$$

where $T_{coolant}$ is the temperature of the coolant, $P_d$ is the power dissipation produced by the motor, $\Theta_{coil-coolant}$ is the thermal impedance of the motor (or thermal dynamic property of the motor), * is the convolution operator, t is time, $I_s$ is the amplitude of the motor current, and $N_r$ is the motor speed. Thus, there is a temperature difference between the coil and the coolant proportional to the power dissipation of the motor.

Using a Laplace transformation of Equation 1, $\Theta_{coil-coolant}$ may be defined as $$\Theta_{coil-coolant}(s) = \frac{\Delta T(s)}{P_d(s)} = \frac{T_{coil} - T_{coolant}}{P_d} \quad (2)$$

In many cases, the thermal impedance of motor may be regarded as a first order system and expressed as $$\Theta_{coil-coolant}(s) = \frac{R_\theta}{1 - \tau s}, \quad (3)$$

where $R_\theta$ is the thermal resistance of the motor, and $\tau$ is the time constant of the thermal system.

Each of these parameters may be calculated from the coil temperature when $T_{coolant}$ and $P_d$ are constant. $R_\theta$ may be estimated from the steady-state temperature difference between the coil and coolant, and $\tau$ may be calculated from the rate of temperature increase. That is, $$R_\theta = \frac{T_{coil} - T_{coolant}}{P_d} \text{ when } t \to \infty, \text{ and} \quad (4)$$

$$\tau \approx \frac{P_d \cdot R_\theta \cdot \Delta t}{T_{coil} - T_{coolant}}, \quad (5)$$

where $\Delta t$ is the duration of time when $P_d$ is applied. Equation 5 holds true if $\Delta t$ is sufficiently small so that the temperature increase can be approximated as the ramp signal.

$R_\theta$ may be used to assess the allowable power dissipation in the steady state, and $\tau$ can be used to limit the transient torque at a given temperature condition. Since the power dissipation is not part of the motor control variables, and has no direct relationship with them, a conversion from the copper loss to the torque limit is provided as one of the control variables of the motor control.

Referring again to FIG. 2, T* is the temperature setting or reference (i.e., maximum operational temperature), $T_{NTC}$ is the motor temperature from the sensor, and $T_{coil}$ is the lead-compensated temperature. $P_{d(ff)}$ is the allowable continuous power dissipation, $P_{d(max)}$* is the power dissipation limited by the maximum current rating of the motor and inverter, and $P_{d(max)}$ is the instantaneous limit of the power dissipation. $T_{e(max)}$ is the maximum torque limit, and $\psi$* is the available motor flux or the physical quantity representing the voltage availability in the motor drive system, and may be expressed as $$\psi^* = \frac{K_{dc} \cdot V_{dc}}{N_r}, \quad (6)$$

where $K_{dc}$ is the correlation coefficient between the flux and the direct current (DC) bus voltage of the inverter 24. $K_{dc}$ may be determined from the voltage utilization ratio of the inverter 24. The torque command is not directly proportional to the motor current (especially during field weakening operation). Thus, the power dissipation/torque conversion block 42 converts the allowable power dissipation limit to the allowable torque limit with a given motor flux.

Figure 3:
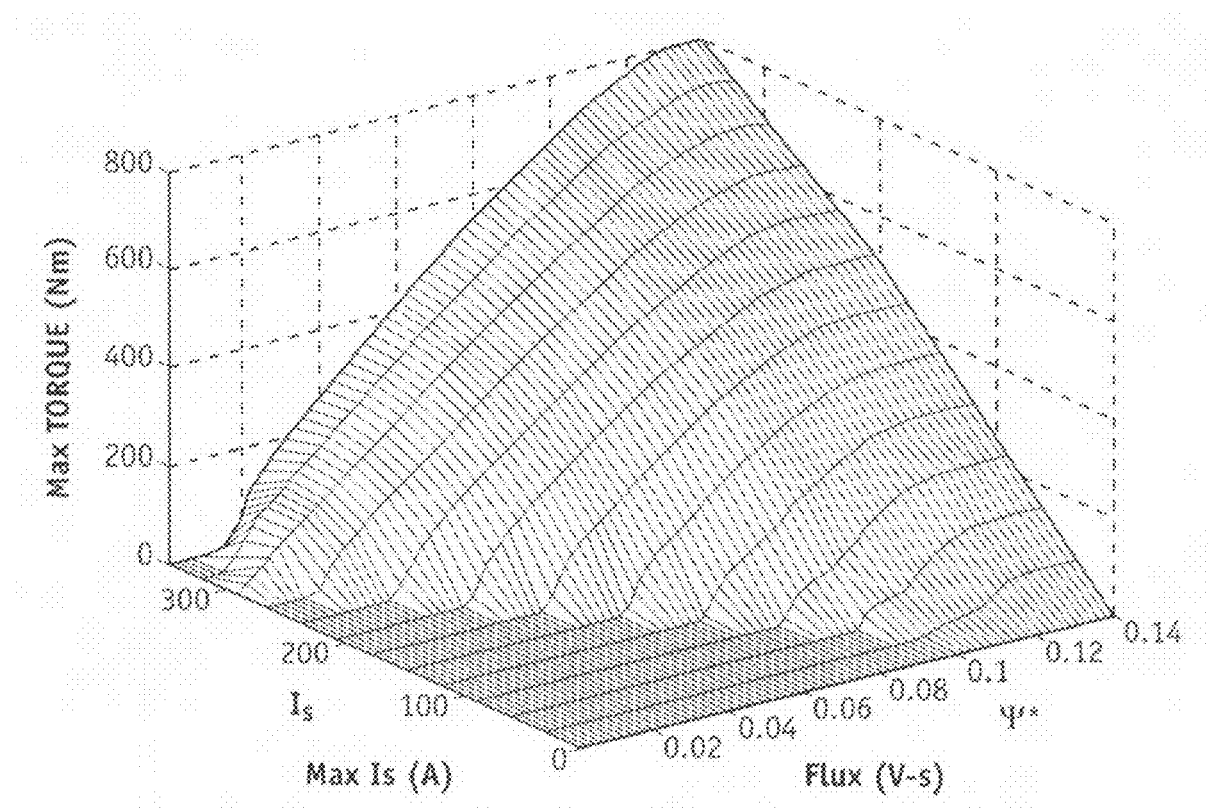
FIG. 3 is a graph comparing current and magnetic flux levels in a motor to the maximum torque available for the motor.
Figure 4:
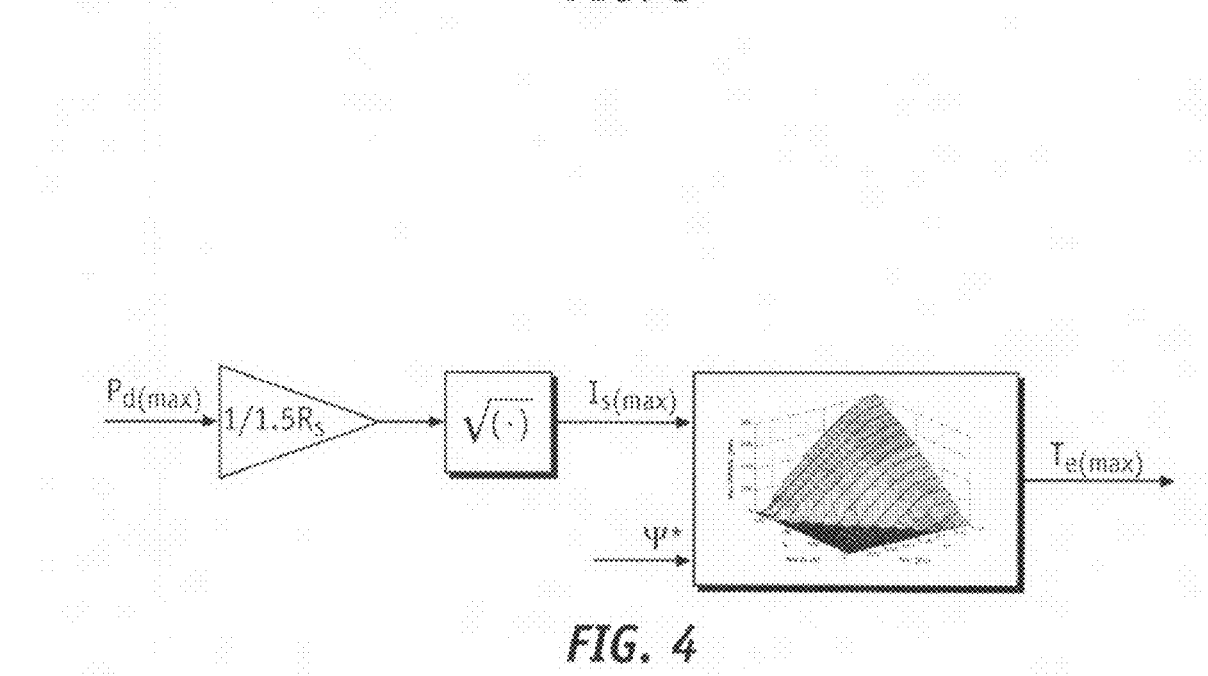
FIG. 4 is a schematic block diagram of a method and/or system for converting a maximum power dissipation of a motor to a maximum torque for the motor.

FIG. 3 graphically characterizes, for a permanent-magnet synchronous motor, the motor torque generated based on the current limit ($I_s$) and operating flux ($\psi$*). Such a comparison may be used to convert the power dissipation to the torque limit as illustrated in FIG. 4. As will be appreciated by skilled in the art, low flux indicates high speed or low DC bus voltage, where the allowable torque can be limited with the same amount of motor current. In the example shown in FIG. 3, at low speed or high DC bus voltage, most of the motor current contributes to the torque generated, while a portion of torque-contributing current is reduced due to the field weakening current. For example, with 75 A current, the specific motor characterized in FIG. 3 is capable of providing about 200 Nm of torque at $\psi$*=0.14 (V·s), but the available torque becomes zero with $\psi$*=0.04 (V·s). Such a graph, or comparison, may be used to convert the power dissipation to the torque limit, as illustrated in FIG. 4.

Referring again to FIG. 2, the PI regulator 38 receives a feed-forward term ($P_{d(ff)}$) that is derived from Equations 2, 3, and 4, and may be expressed as $$P_{d(ff)} = \frac{T^* - T_{coolant}}{R_\theta} \quad (7)$$

and represents the allowable continuous power dissipation, which is determined by the temperature difference between the temperature limit and the coolant temperature. This feed-forward term minimizes the overshoot of the temperature response and the undershoot of the torque. In one embodiment, the coolant temperature ($T_{coolant}$) may be estimated from the inverter temperature, as the coolant of the inverter passes through the motor as well. It should be noted that the heat sink temperature of the inverter may be measured to protect the overheating of silicon devices inside the power modules within the inverter. The heat sink temperature may be substantially the same as the coolant temperature and may be used to calculate the allowable continuous power dissipation, as expressed in Equation 7.

The upper limit of the integrator 56 of the PI regulator 38 shown in FIG. 2 is clamped to zero to prevent excessive power dissipation when the winding temperature is lower than the temperature limit. As a result, in steady state operation (i.e., when the winding temperature is sufficiently lower than the temperature limit), only the proportional term and the feed-forward term operate to provide the allowable power dissipation or stator current. The function of the integrator is to compensate the effect of the core loss when the coil temperature goes beyond the temperature limit. The gain of the PI regulator 38 may be expressed as $$K_p = \frac{\tau_r \omega_{bw}}{R_\theta}, \quad (8)$$

and $$K_i = \frac{\omega_{bw}}{R_\theta}, \quad (9)$$

where $\omega_{bw}$ is the bandwidth and $\tau_r$ is the time constant of the PI regulator 38. In order to have a first order response of $T_{coil}$, $\tau_r$ should be equal to the time constant of $T_{coil}$ response, which results in the first order response having a bandwidth that is equal to $\omega_{bw}$. If the coil temperature is sufficiently lower than the reference temperature and the initial output of the integrator is clamped to zero, then the instantaneous power limit ($P_{d(max)}$) may be expressed as $$P_{d(max)} = K_p \cdot (T^* - T_{coil}) + P_{d(ff)} \quad (10)$$

$$= \frac{1}{R_\theta} \cdot [(\tau_r \omega_{bw}) \cdot (T^* - T_{coil}) + (T^* - T_{coolant})]$$

As indicated by Equation 10, the instantaneous power limit will be substantially limited by the difference between the coil temperature and the reference temperature, assuming $Y_r \omega_{bw}$ is sufficiently greater than 1. An increased bandwidth of the temperature control loop results in a higher power limit. However, a shorter duration of peak torque or power also results. Thus, $\omega_{bw}$ is determined by the duty ratio or the time duration of peak torque or power exceeding the continuous limit. $K_p$ also suppresses the wind-up phenomenon of the integrator that occurs when the output of the PI regulator 38 reaches its maximum or minimum. If the output is clamped to its limit, the difference between the PI output and the real output ($P_{d(max)}$) is subtracted and fed to reduce the integrator value of the PI regulator 38 after being multiplied by the $1/K_p$ gain.

If there are any heat concentrations (i.e., "hot spots") inside the motor, such as the end winding, the transient response of the temperature at the hottest spot may be different to other points until the motor attains thermal equilibrium. Additionally, there may be a difference between the actual temperature within the motor and the temperature measured by the sensor. The lead compensator 36 compensates for the delay of the temperature sensor in order to estimate and the control the instantaneous coil temperature.

Figure 5:
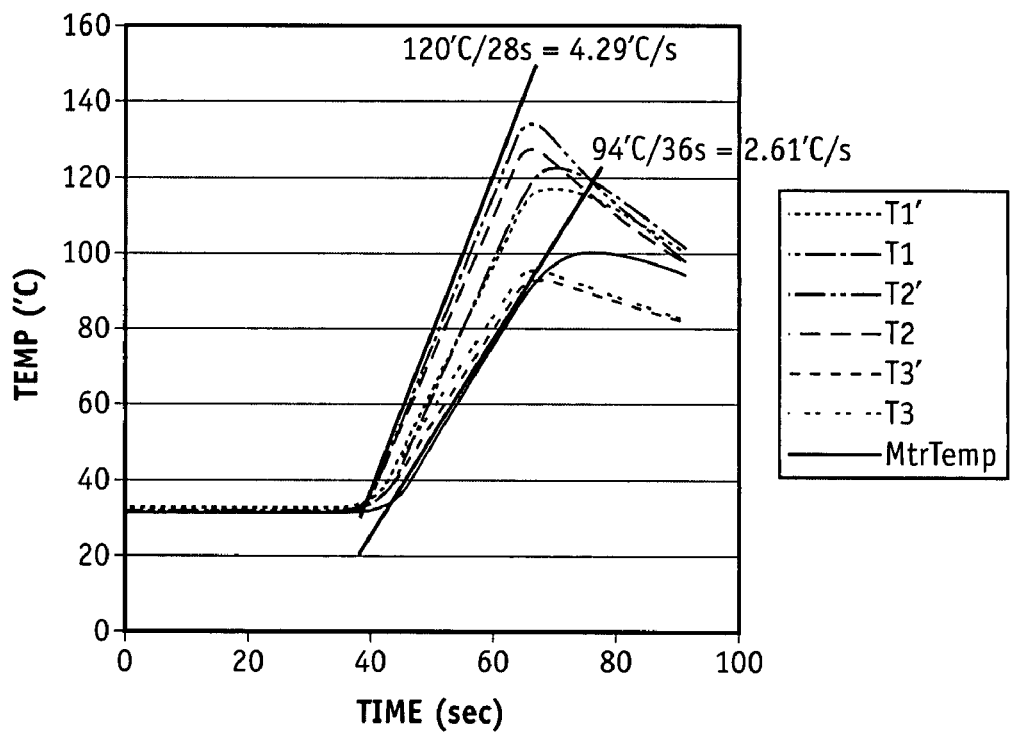
FIG. 5 is a graph comparing the temperature readings of several temperature sensors in a motor.

FIG. 5 graphically illustrates exemplary temperatures measured by the sensors inside the motor 30 when the peak torque command is applied. As shown, the initial (i.e., 0-40 s) steady-state responses (or temperature readings) are identical. However, at approximately 40 s, discrepancies between the various readings occur. In the exemplary experimental system of FIG. 3, six different thermocouples were installed in the motor windings, and a "thermistor" (i.e., a resistor used to measure temperature changes) was attached to represent the coil temperature.

Figure 6:
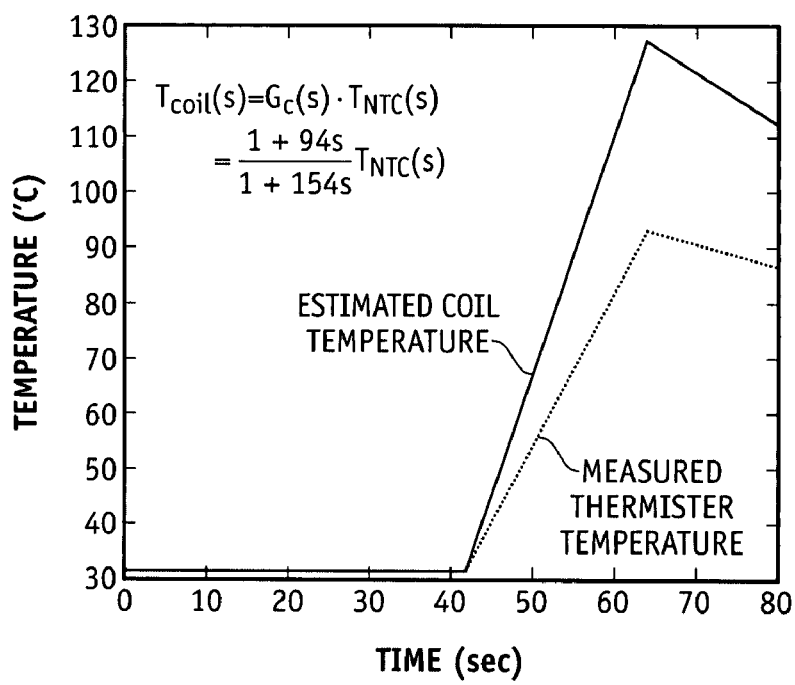
FIG. 6 is a graph comparing a measured temperature within a motor to an estimated coil temperature of the motor.

Referring to FIG. 6, with the known thermal dynamics of temperature sensors, the output of the lead compensator 36 is used to estimate the hot spot temperature inside the motor. With known thermal resistance and power dissipation when the temperature was rising with the rate of 2.61° C./s in FIG. 6, the time constant of the thermistor ($\tau$) was measured to be 154 s. However, the temperature of the hot spot increased faster than that of the thermistor, and its time constant ($\tau_c$) was measured to be 94 s, based on 4.29° C./s of temperature change at the hottest spot. The transfer function, which demonstrates the relationship between the temperature of the coil ($T_{coil}$) and the temperature as measured by the thermistor ($T_{NTC}$), of the lead compensator 36 may then be expressed as $$G_c(s) = \frac{T_{coil}}{T_{NTC}} = \frac{1 + \tau s}{1 + \tau_c s} = \frac{1 + 94s}{1 + 154s} \quad (11)$$

In accordance with one aspect of the present invention, $T_{e(max)}$, is used to limit the torque command of the motor. Depending on the operating speed of the motor 30 and the DC bus voltage of the inverter 24, the torque limit is calculated, using a graph or table similar to that shown in FIG. 3, from the allowable current and flux, as illustrated in FIG. 4. The torque limit is then used to limit the torque command.

As illustrated in FIG. 7, a field weakening algorithm, as is commonly understood, is then used to generate a current command from the limited torque at a particular speed ($N_r$) and the DC bus voltage of the inverter 24. In one embodiment, the current command includes two commands, $i_d^*$ and $i_q^*$, to control current within the DC bus voltage limited by the inverter 24. When the initial torque command ($T_e^{**}$) is out of range of $T_{e(max)}$, and the absolute value of $T_e^*$, then the magnitude from the output current command is to be equal, or approximately equal, to the allowable current ($I_{s(max)}$, and may be expressed as $$I_s^* = \sqrt{(i_d^*)^2 + (i_q^*)^2} \approx I_{s(max)}. \quad (12)$$

However, when the current for the field weakening is larger than the allowable current, the present current magnitude ($I_s^*$) will determine the minimum allowable power dissipation ($P_{d(min)}$), expressed as $$P_{d(min)} = 1.5 R_s (I_s^*)^2, \quad (13)$$

and shown in FIG. 2. When the operating current is larger than the allowable current, the temperature control goes into an "uncontrollable" mode. If the motor speed is the reduced or the DC bus voltage is increased to increase the motor flux ($\psi^*$), the field weakening current is reduced. The temperature control then returns to the controllable mode, at which point the allowable current is larger than the field weakening current.

One advantage of the method and/or system described above is that a manner is provided to reasonably assess the instantaneous and continuous power or torque rating of the motor by limiting the instantaneous motor temperature. As a result, a less conservative temperature limit may be utilized because the likelihood of exceeding the temperature limit is reduced. Another advantage is that the power and/or torque density of the motor may be increased. Further, the method and/or system allows for the motor to be continuously controlled at various stages of operation and facilitates continuous operation of the motor while limiting the operating temperature.

Figure 8:
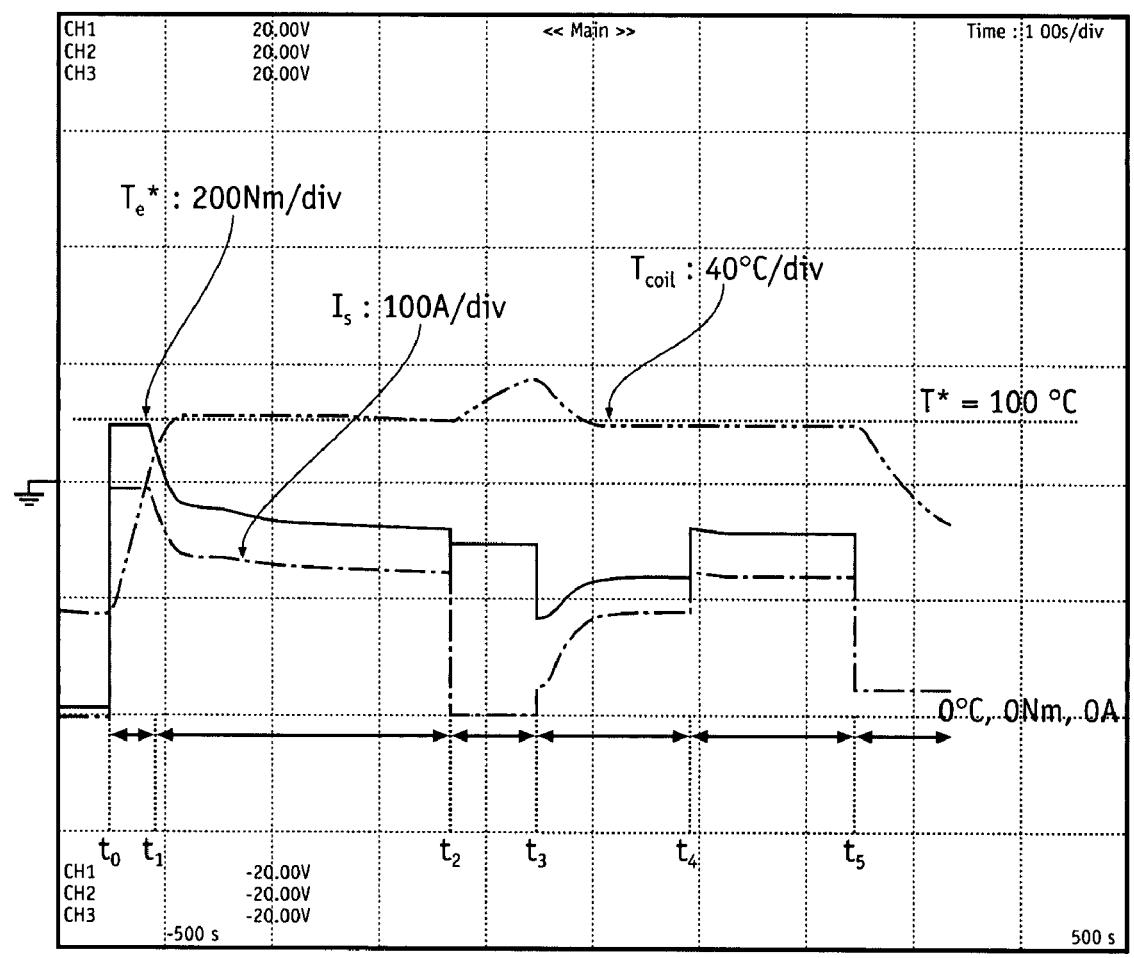
FIG. 8 is a graph of various results of an experimental motor operation conducted in accordance with the present invention.

FIGS. 8 and 9 illustrate results of exemplary experimental operation of a motor using the method and/or system 34 described above. The method and/or system was implemented in conjunction with a permanent magnet motor with a 25 kW continuous power rating. The temperature reference ($T^*$) and the coolant temperature ($T_{coolant}$) were set to 100° C. and 25° C., respectively.

At $t_0$, 500 Nm of torque command ($T_e^{}$) was applied, and was maintained until $t_5$. FIG. 9 indicates the operating conditions of the various stages (P1-P6) of the experiment. During P1, because there is a sufficient difference between the temperature reference and the coil temperature, the output torque was able the torque command. However, at $t_1$, the coil temperature neared the temperature reference, and the torque limit ($T_{e(max)}$) became lower than the original torque command ($T_e^{}$). Thus, the rate of the temperature increased was reduced.

During P2, the coil temperature was controlled to be equal to the temperature reference, while the torque limit ($T_{e(max)}$, was reduced by the PI regulator 38 to limit the allowable power dissipation or the allowable copper loss inside the motor. The slow reduction of the torque limit during P2 indicates that the PI regulator 38 reduced the allowable copper loss to compensate for the contribution of the core loss to the temperature increase.

During P3, the operating speed increased from 500 r/min to 1200 r/min. Before $t_2$, the output current was clamped to 120 A, but it was rapidly increased to about 150 A due to the effect of the field weakening current. However, at the same time, the torque command ($T_e^*$) was set to zero, which indicates that during that time all of the motor current contributed only to field-weakening control. Also during P3, because the output current exceeded the current limit provided by the allowable power dissipation, the entire thermal system operated in the uncontrolled mode. As a result, the coil temperature increased above the temperature reference.

During P4, the operating speed was reduced to 800 r/min, thereby reducing the field weakening current. Due to the effect of the field weakening current, the steady-state output torque was clamped to about 180 Nm, while the torque limit at the end of P2 was above 300 Nm at 500 r/min. Moreover, due to the effect of the core loss (that increases with the operating speed), the output current was clamped at slightly less than 120 Apk (i.e., peak current). This amount is less than the output current at the end of P2, thus indicating the operation of the PI regulator 38 to compensate the core loss.

During P5, the operating speed returned to 500 r/min. By the end of P5, the output torque and the current limit had returned to the values present at the end of P2. After $t_5$, the torque command ($T_e^{**}$) was changed to 50 Nm. 50 Nm of torque command at 500 r/min in this motor requires 20 Apk of output current, which is considerably less than the allowable current limit determined by the allowable power dissipation in FIGS. 2 and 4. As such, the coil temperature decreased from the temperature reference.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for limiting an operational temperature of a motor comprising:
   receiving a maximum operational temperature of the motor;
   determining a current operational temperature within the motor;
   calculating a maximum allowable power dissipation of the motor based at least in part on the maximum operational temperature and the current operational temperature of the motor, wherein the calculating of the maximum allowable power dissipation comprises determining a difference between the maximum operational temperature and the current operational temperature and is a function of the difference between the maximum operational temperature and the current operational temperature;
   calculating a maximum allowable current of the motor based on the maximum allowable power dissipation;
   calculating an available amount of magnetic flux within the motor;
   generating a torque command limit for the motor based at least in part on the maximum allowable power dissipation, the maximum allowable current, and the available amount of magnetic flux; and
   operating the motor based on the torque command limit.

2. The method of claim 1, wherein the calculating of the maximum allowable power dissipation based at least in part on the maximum operational temperature and the current operational temperature of the motor is performed by a proportional integral regulator, the proportional integral regulator comprising a proportional gain and an integrator gain.

3. The method of claim 2, wherein the motor comprises at least one coil and the determining of the current operational temperature is at least partially performed by a temperature sensor within the motor.

4. The method of claim 3, wherein the determining of the current operational temperature comprises estimating a coil temperature within the at least one coil of the motor from the current operational temperature.

5. The method of claim 4, further comprising generating at least one current command based at least in part on the torque command limit.

6. The method of claim 5, wherein the generating of the least one current command is performed at least in part based on a field weakening algorithm.

7. A method for limiting an operational temperature of an electric motor in an automobile comprising:
   determining a maximum operational temperature of the motor;
   determining a current operational temperature within the motor;
   calculating a difference between the maximum operational temperature and the current operational temperature;
   calculating a maximum allowable power dissipation of the motor based at least in part on the difference between the maximum operational temperature and the current operational temperature of the motor, the maximum allowable power dissipation being proportional to the difference;
   calculating a maximum allowable current for the motor based on the maximum allowable power dissipation;
   determining an available amount of magnetic flux within the motor;
   generating a torque command limit for the motor based at least in part on the maximum allowable current and the available amount of magnetic flux within the motor; and
   operating the motor based on the torque command limit.

8. The method of claim 7, wherein the motor comprises at least one coil and the determining of the current operational temperature comprises sensing a temperature within the motor.

9. The method of claim 8, wherein the determining of the current operational temperature comprises estimating a coil temperature within the at least one coil of the motor from the sensed temperature within the motor.

10. The method of claim 9, further comprising generating at least one current command for the motor based at least in part on the torque command limit.

11. The method of claim 10, wherein the generating of the at least one current command for the motor is performed at least in part based on a field weakening algorithm.

12. An automotive drive system comprising:
   a motor;
   a power supply coupled to the motor; and
   a processor in operable communication with the motor and the power supply, the processor being configured to:

receive a maximum operational temperature of the motor;

determine a current operational temperature within the motor;

calculate a maximum allowable power dissipation of the motor based at least in part on the maximum operational temperature and the current operational temperature of the motor;

calculate a maximum allowable current of the motor based on the maximum allowable power dissipation;

calculate an available amount of magnetic flux within the motor and generate a torque command limit for the motor based at least in part on the maximum allowable power dissipation, the maximum allowable current, and the available amount of magnetic flux.

13. The automotive drive system of claim 12, wherein the motor comprises at least one coil and the determining of the current operational temperature comprises sensing a temperature within the motor.

14. The automotive drive system of claim 13, wherein the determining of the current operational temperature comprises estimating a coil temperature within the at least one coil of the motor from the sensed temperature within the motor.

15. The automotive drive system of claim 14, wherein the processor is further configured to generate at least one current command for the motor based at least in part on the torque command limit.

16. The automotive drive system of claim 15, wherein the generating of the at least one current command for the motor is performed at least in part based on a field weakening algorithm.

* * * * *